Figures 4, 5:
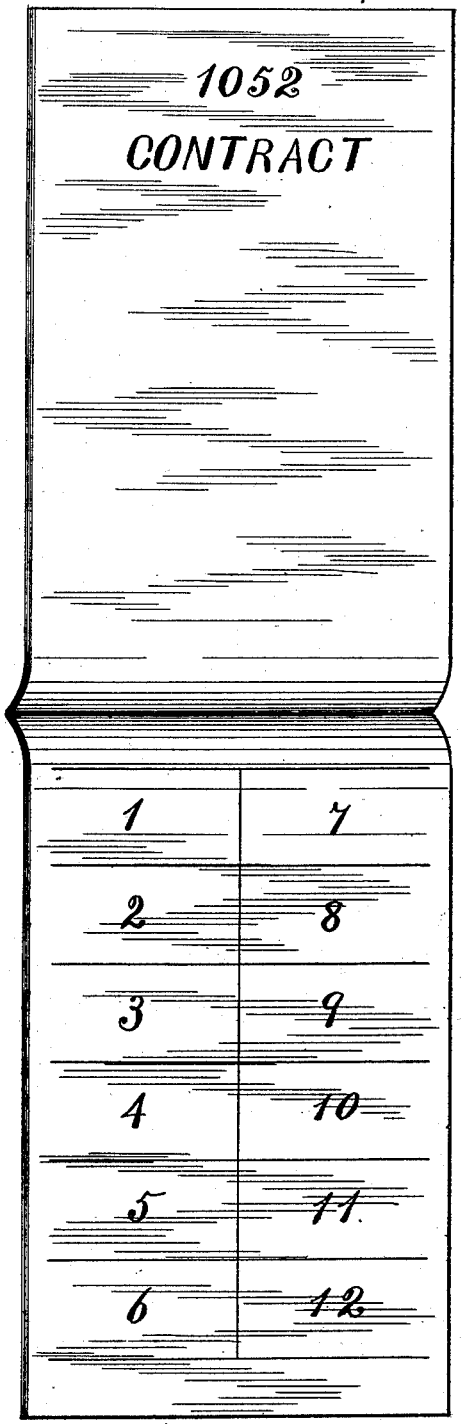

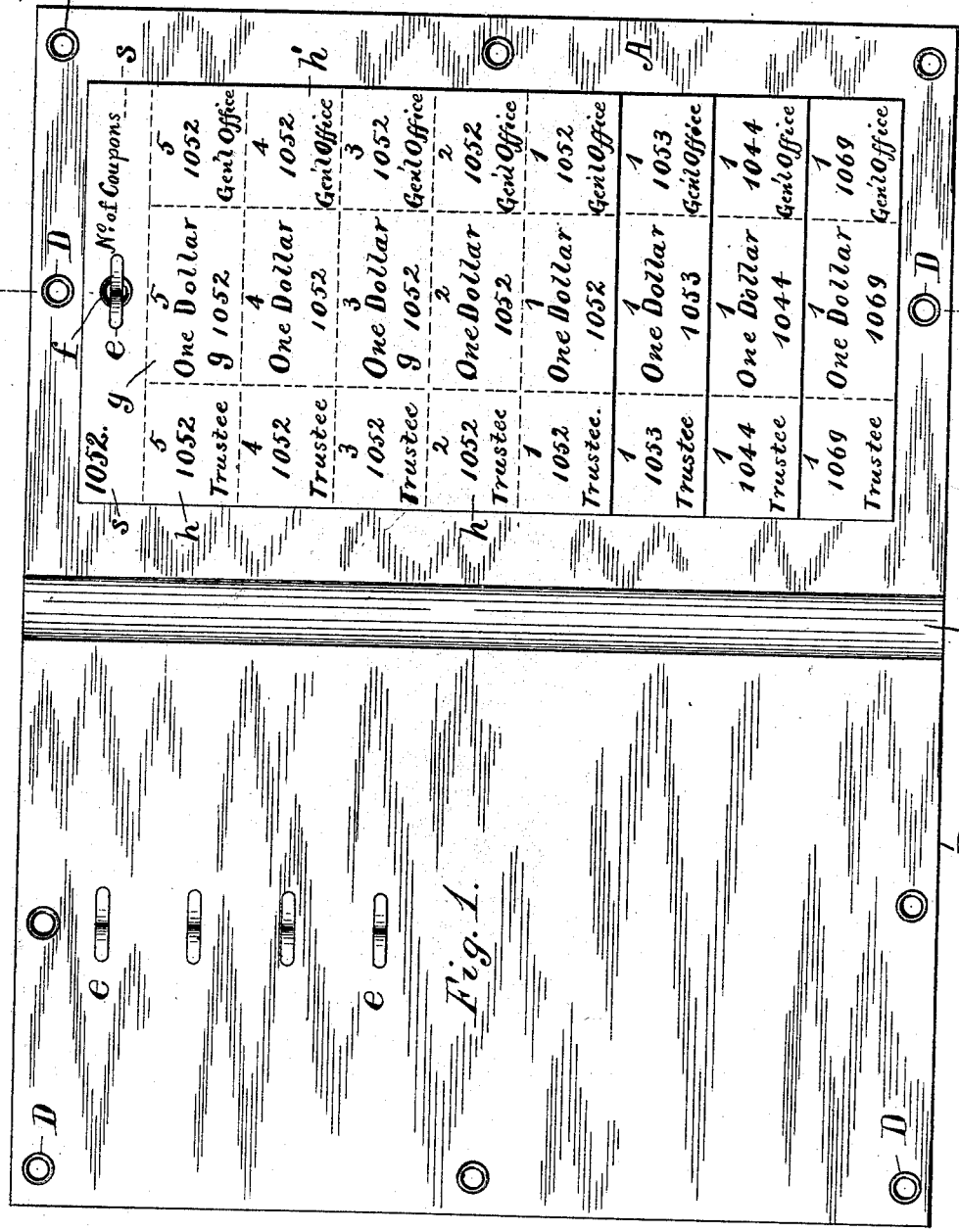

(No Model.) 3 Sheets—Sheet 2.

A. L. EASTMAN & W. H. BABCOCK.
MEANS FOR KEEPING ACCOUNTS.

No. 510,011. Patented Dec. 5, 1893.

Attest:
L. Lee.
J. Van Nest Jr.

Inventors.
A. L. Eastman and W. H. Babcock,
per Crane & Miller, attys.

(No Model.) 3 Sheets—Sheet 3.

A. L. EASTMAN & W. H. BABCOCK.
MEANS FOR KEEPING ACCOUNTS.

No. 510,011. Patented Dec. 5, 1893.

Attest:
L. Lee.
J. Van Nest Jr.

Inventors.
A. L. Eastman and W. H. Babcock,
per Crane & Miller, Attys.

UNITED STATES PATENT OFFICE.

ADELBERT L. EASTMAN, OF MORRISTOWN, NEW JERSEY, AND WILLIAM H. BABCOCK, OF NEW YORK, N. Y.

MEANS FOR KEEPING ACCOUNTS.

SPECIFICATION forming part of Letters Patent No. 510,011, dated December 5, 1893.

Application filed March 1, 1892. Serial No. 423,346. (No specimens.)

*To all whom it may concern:*

Be it known that we, ADELBERT L. EASTMAN, residing at Morristown, Morris county, New Jersey, and WILLIAM H. BABCOCK, residing in the city, county, and State of New York, citizens of the United States, have invented certain new and useful Improvements in Means for Keeping Accounts, fully described and represented in the following specification and the accompanying drawings, forming a part of the same.

The object of this invention is to furnish a simple and effective means of keeping an account of installment payments.

The invention consists partly in the combination, with a stub, of a series of coupons subdivided into two or more detachable slips similarly numbered, the several coupons of the series being serially numbered; and partly in record slips and books for use in conjunction therewith.

In the annexed drawings, Figure 1 represents a book open to expose several series of coupons attached to one of its covers. Fig. 2 is a section on line $x$ $x$ in Fig. 1. Figs. 3 and 4 are face views of two record cards divided into spaces for the attachment of the record slips detached from the coupons; and Fig. 5 is a view of a contract book open to expose its inner pages.

The book shown in Figs. 1 and 2 comprises the covers A, B, connected by the flexible back C and having the eyelets D within their edges, and four detachable pads of which the leaves are bound together by means of the eyelets $f$; such pads being secured to the cover A by the paper fasteners $e$ inserted through the eyelets D and $f$. Each pad is composed of four leaves divided into a stub and coupons, the said coupons being subdivided into receipt and record slips $g$, $h$ and $h'$, respectively. All the members of the series composing the pad are provided with the same series number, as "1052" in the upper pad in Fig. 1; and the several coupons of the series bear also serial numbers which are common to their individual members, as "1," "2," "3," "4," &c., in the series numbered "1052" in Fig. 1.

The record slips are preferably furnished with some mark to indicate to whom they are to be sent when detached, as indicated by the words "Trustee" and "Gen'l Office" applied thereto in Fig. 1. The number of coupons in the series is governed by and corresponds with the number of payments called for in the contract.

The record cards shown in Figs. 3 and 4 are divided into spaces suitable for receiving the record slips $h$ and $h'$ as they are detached, and are provided at the top and bottom with any desired data to be supplied with the record slips attached thereto.

Each contract book bears the number of one of the series of coupons; that shown in Fig. 5 being numbered "1052" to correspond with the similar number of the upper series of coupons shown in Fig. 1. The contract books are provided also with leaves divided into spaces suitable for receiving the receipt slips detached from the corresponding coupon book bearing like numbers.

The device, as above described, may be used as follows:—Upon the conclusion of each sale the agent holding a coupon book furnishes the purchaser with a contract book bearing the number of one of the series of coupons in his coupon book and containing a contract as to installment payments and other matters relating to the sale; and at each payment the agent detaches a coupon of the said series, affixing the receipt slip thereof to one of the spaces provided for it in the contract book, and retaining the record slips for application to similar spaces upon the record cards similarly denominated. The record cards with record slips attached thereto may be turned in periodically or whenever the spaces become filled.

The invention, as above described, may be used in keeping an account of the payments made in the sale of sewing machines, furniture, clothing or other articles upon installments, and is also adapted for the use of building and loan associations, insurance companies, or other companies organized to sell benefits of any kind upon partial payments.

The transactions set forth above may be effected so easily and speedily that the invention is adapted for use in drug or cigar stores, or in other places of business in which the clerks are liable to have leisure moments from the regular established business in which to carry on an agency for an organization such as referred to.

In order to avoid inconvenience in properly applying the receipt and record slips as they are detached, the whole sheet of coupons is preferably coated upon the back with an adhesive coating, which requires the mere moistening of the slip in order to affix it as required.

It will be observed that the record of a sale and of the installments paid thereon from time to time may, by the use of our improvement, be kept by the agent, by means of the stub s which would remain permanently in his possession; by his principal to whom he sends the detached record slips at stated intervals; and by the purchaser holding a contract book to the pages of which are affixed the receipt slips for each of his payments.

The device shown herein provides also means for notifying, in addition, a trustee, in such cases where it is deemed desirable to secure the services of such officer to keep the money with a record of the money transactions of the organization.

Having thus set forth the invention, what we claim herein is—

1. The means herein described for keeping account of partial payments consisting of a leaf divided into a stub and coupons, the said coupons being subdivided each into a set of two or more detachable slips constituting receipt and record portions, and the subdivisions of each coupon being similarly numbered.

2. The means herein described for keeping account of partial payments consisting of a leaf divided into a stub and coupons, the said coupons being subdivided each into a set of two or more detachable slips constituting receipt and record portions, and the subdivisions of each coupon being similarly numbered and the several coupons serially numbered.

3. The combination, with a coupon book comprising a cover having a series of leaves attached thereto, each leaf being divided into a stub and a series of coupons serially numbered, and each coupon being subdivided into a set of two or more detachable slips constituting receipt and record portions similarly numbered, of a separate receipt or contract book having spaces upon its leaves corresponding in number with the series of coupons, as herein shown and described.

4. The combination, with a coupon book comprising a cover having a series of leaves attached thereto, each leaf being divided into a stub and a series of coupons serially numbered, and each coupon being subdivided into a set of two or more detachable slips constituting receipt and record portions similarly numbered, of a separate receipt or contract book having spaces upon its leaves to correspond with the number of coupons in a series, and one or more record cards to receive the record slips, as herein shown and described.

In testimony whereof we have hereunto set our hands in the presence of two subscribing witnesses.

ADELBERT L. EASTMAN.
WILLIAM H. BABCOCK.

Witnesses:
  JNO. B. BURNS,
  THOS. S. CRANE.